United States Patent [19]
Chaseling et al.

[11] Patent Number: 5,292,152
[45] Date of Patent: Mar. 8, 1994

[54] TRANSPORT APPARATUS

[76] Inventors: Arthur W. Chaseling, 10 Malvern Street, Albany Creek, Queensland, Australia, 4035; Peter B. McGiffin, 11 Sidney Street, Clayfield, Queensland, Australia, 4011

[21] Appl. No.: 784,551

[22] Filed: Oct. 29, 1991

[30] Foreign Application Priority Data
Oct. 2, 1990 [AU] Australia .................. PK3156

[51] Int. Cl.⁵ .................. B62D 21/02; B62D 21/20
[52] U.S. Cl. .................. 280/789; 280/488
[58] Field of Search ............ 280/799, 800, 796, 781, 280/785, 789, 418.1, 488, 499; 296/204, 182

[56] References Cited
U.S. PATENT DOCUMENTS

| | | | |
|---|---|---|---|
| 3,476,405 | 11/1969 | Cunha | 280/418.1 |
| 3,486,768 | 12/1969 | Masser | 280/418.1 |
| 3,761,108 | 9/1973 | Hemmings | 280/788 |
| 3,856,319 | 12/1974 | Hardy | 280/788 |
| 5,011,170 | 4/1991 | Forbes | 280/512 |

FOREIGN PATENT DOCUMENTS
747335  4/1956  United Kingdom ............... 280/499

Primary Examiner—Karin L. Tyson
Attorney, Agent, or Firm—Amster, Rothstein & Ebenstein

[57] ABSTRACT

Hitch apparatus is disclosed with particular application to open-topped bulk-haulage trailers, the hitch apparatus comprising a pair of hitch beams which are joined at a hitch pin at the front of the trailer and diverge laterally and rearwardly to join to the front corners of a hopper or the like. The ends of the hitch beams remote from the hitch pin are joined by a cross-beam which reacts the transverse component of the bending moment generated within the hitch beams by the longitudinal offset between gravity forces in the hopper and the hitch pin. The hitch beams and the cross beam are preferably formed from fabricated I-beam sections to maximise the structural efficiency.

13 Claims, 3 Drawing Sheets

TRANSPORT APPARATUS

BACKGROUND OF THE INVENTION

This invention relates to articulated trailers (such as those which transport material in open-cut mines) adapted for trailing off-road for transporting bulk material and being larger than trailers which are permitted to operate on public road systems.

This invention has particular but not exclusive application to bulk-haulage trailers for coal and other minerals, and for illustrative purposes reference will be made to such application. However, it is to be understood that this invention could be used in other applications, such as scrapers and other articulated vehicles.

A bulk materials haulage trailer typically comprises a rectangular bottom discharge hopper to the rear of which an axle assembly is attached, and to the front of which a hitch assembly is attached for connection to a prime mover. The hopper is made as wide as is practicable to maximise payload, and the side plates of the hopper are essentially deep-beam members which carry the main bending loads due to the weight of the trailer and its payload.

The major structural problem facing the designer of such a trailer is the transfer of the loads from the widely-spaced side plates to the trailer hitch, which is mounted on the longitudinal centerline of the vehicle. It is known that the fatigue life of welded joints is much lower than that of the parent metal for a given applied stress regime, and that certain weld configurations, including welds made from only one side of a joint, are more susceptible to fatigue failure than welds of simple configuration, or where the welds are accessible from both sides. Various structural configurations are in use on existing vehicles to effect this load transfer, but many are excessively heavy for their capacity, while others contain regions of high stress such that welds employed in the joining of the various plates used to form the structure may be the subject of metal fatigue early in the life of the vehicle. Where the structural configuration includes a pair of main beams extending rearwardly from the trailer hitch and diverging transversely to connect with the front ends of the side plates, the front end of the hopper is subjected to bending moments about longitudinal axes, otherwise known as a transverse bending moment component. The presence of this bending moment can lead to structural failures, or the necessity for making the hopper excessively heavy to resist the moments.

SUMMARY OF THE INVENTION

The present invention aims to alleviate the above disadvantages and to provide transport apparatus which will be reliable and efficient in use. Other objects and advantages of this invention will hereinafter become apparent.

With the foregoing and other objects in view, this invention in one aspect resides broadly in transport apparatus including a cargo enclosure, an axle assembly connected to the rear end of the cargo enclosure, and a hitch assembly connected to the front end of the enclosure. The hitch assembly comprises a hitch pin, a pair of main beam members joining the hitch pin to respective outer portions of the front end, and a cross-beam joining the end portions of respective the main beam members remote from said hitch pin, whereby the cross-beam may react the transverse component of the bending moment generated in the main beam members by their function in supporting the cargo enclosure.

Preferably, the cargo enclosure is in the form of an open-topped hopper for the carriage of bulk materials such as coal or the like. Of course, if desired, the cargo enclosure may take other forms, such as a closed tube for the carriage of liquids.

The main beam members and the cross-beam may be of any desired construction, such as box-beams. Preferably, however, the main beam members and the cross-beam include flange assemblies spaced apart vertically by web members, said web members being of relatively small cross-sectional area relative to said flange assemblies. This form of construction results in a relatively light structure for a given strength and stiffness. In a preferred embodiment, the main beam members and/or the cross-member are formed as I-beams members having substantially vertical webs and substantially horizontal flanges such that the structural efficiency relative to the applied loads, which are predominantly vertical, is maximized, and whereby welds joining flanges to webs and beam sections end-to-end are accessible from both sides of the plates. The latter feature assists greatly in the forming of welds of high fatigue strength.

Auxiliary components may be welded to the main beam and cross-beam members. It is preferred, however, that the auxiliary components be attached thereto by mechanical fasteners such that welds of poor fatigue strength do not compromise the basic fatigue strength of the hitch assembly.

In another aspect, this invention resides in a method of forming a semi-trailer, including the steps of providing a cargo enclosure, an axle assembly, a hitch assembly comprising a hitch pin, a pair of main beam members joining the hitch pin to respective outer portions of the front end, and a cross-beam joining the end portions of respective the main beam members remote from the hitch pin; and then joining the axle assembly to one end of the cargo enclosure, and joining the hitch assembly to the opposite end of the cargo enclosure.

BRIEF DESCRIPTION OF THE DRAWINGS

In order that this invention may be more easily understood and put into practical effect, reference will now be made to the accompanying drawings which illustrate a preferred embodiment of the invention, wherein.

DESCRIPTION OF THE PREFERRED EMBODIMENT

Figure 1:
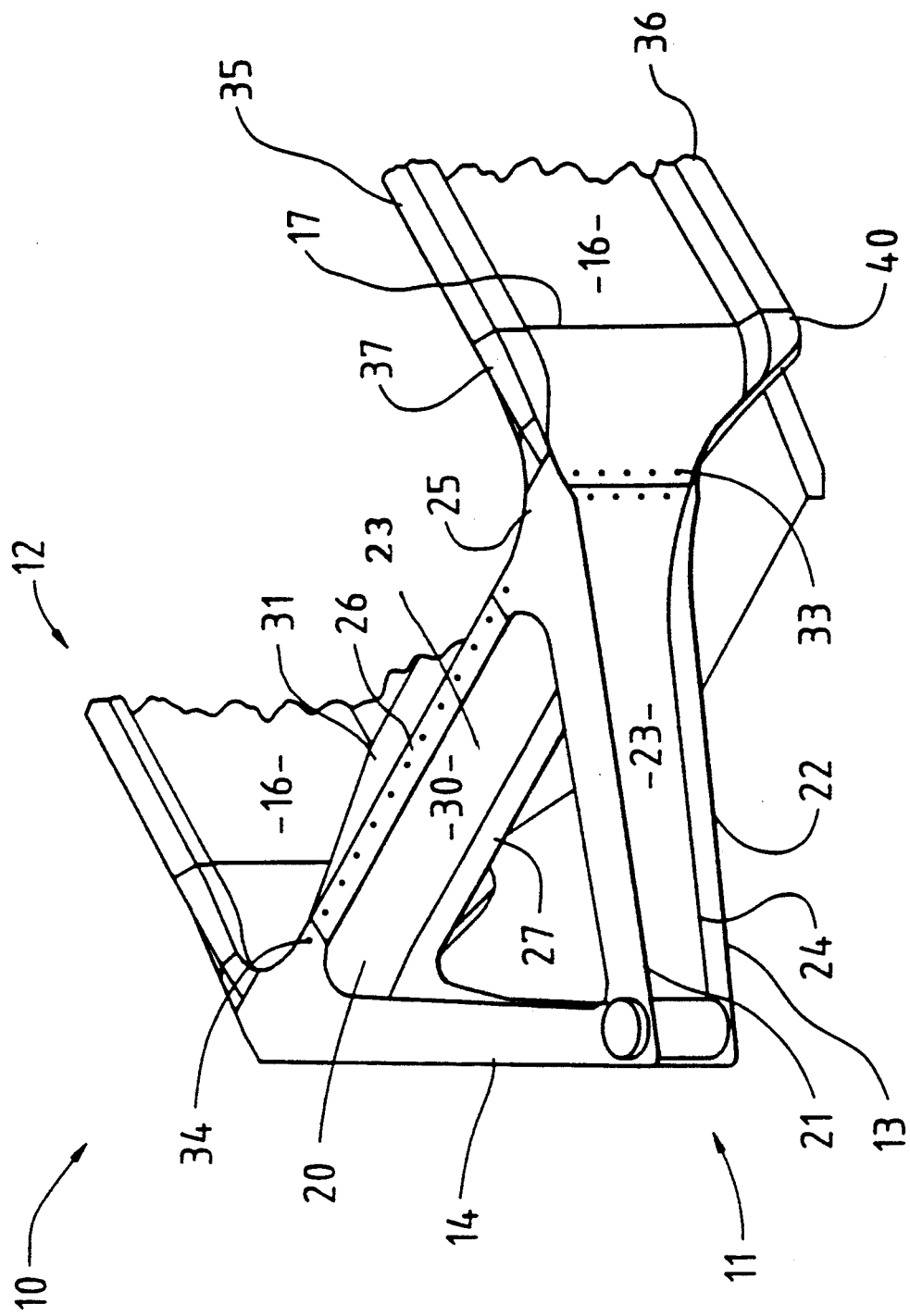
FIG. 1 is a pictorial view of a hitch assembly according to the invention.
Figure 2:
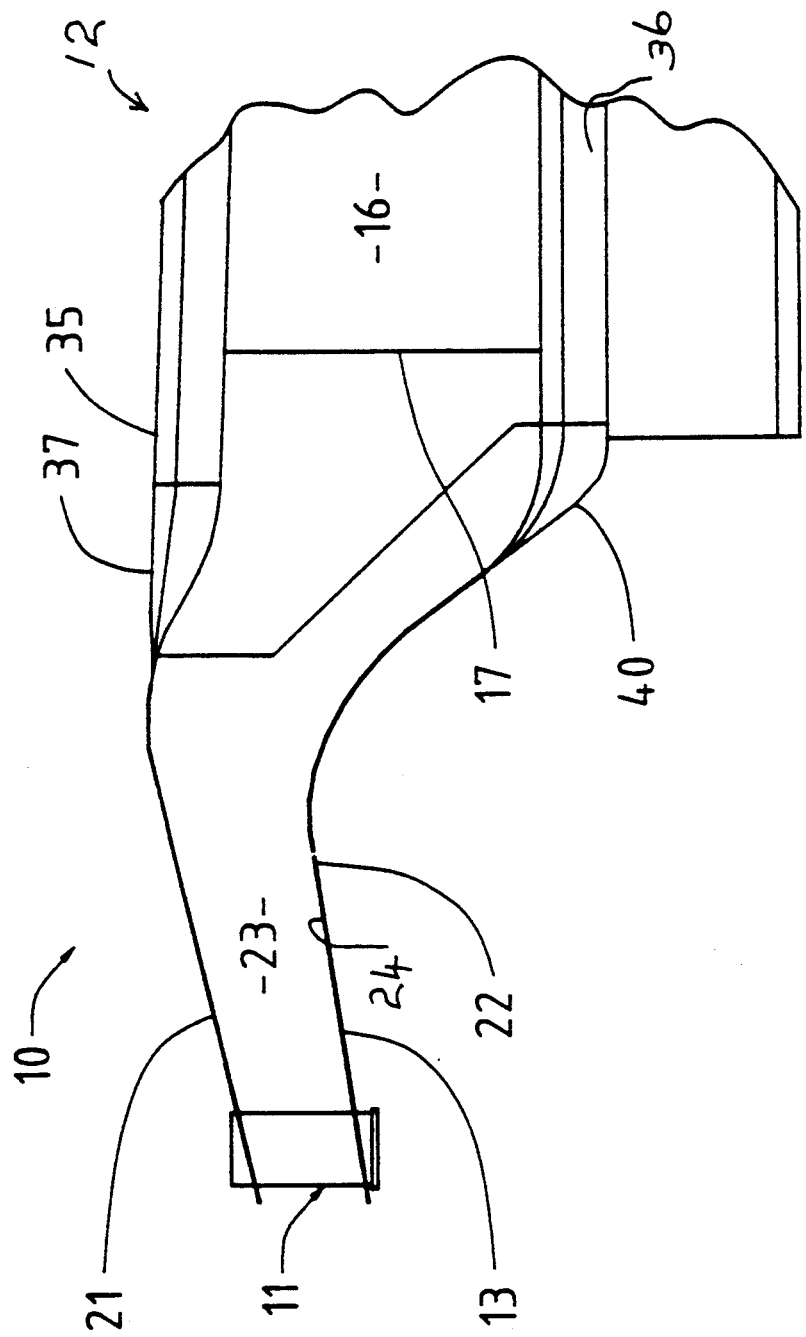
FIG. 2 is a part-sectional side view of the hitch assembly shown in FIG. 1.
Figure 3:
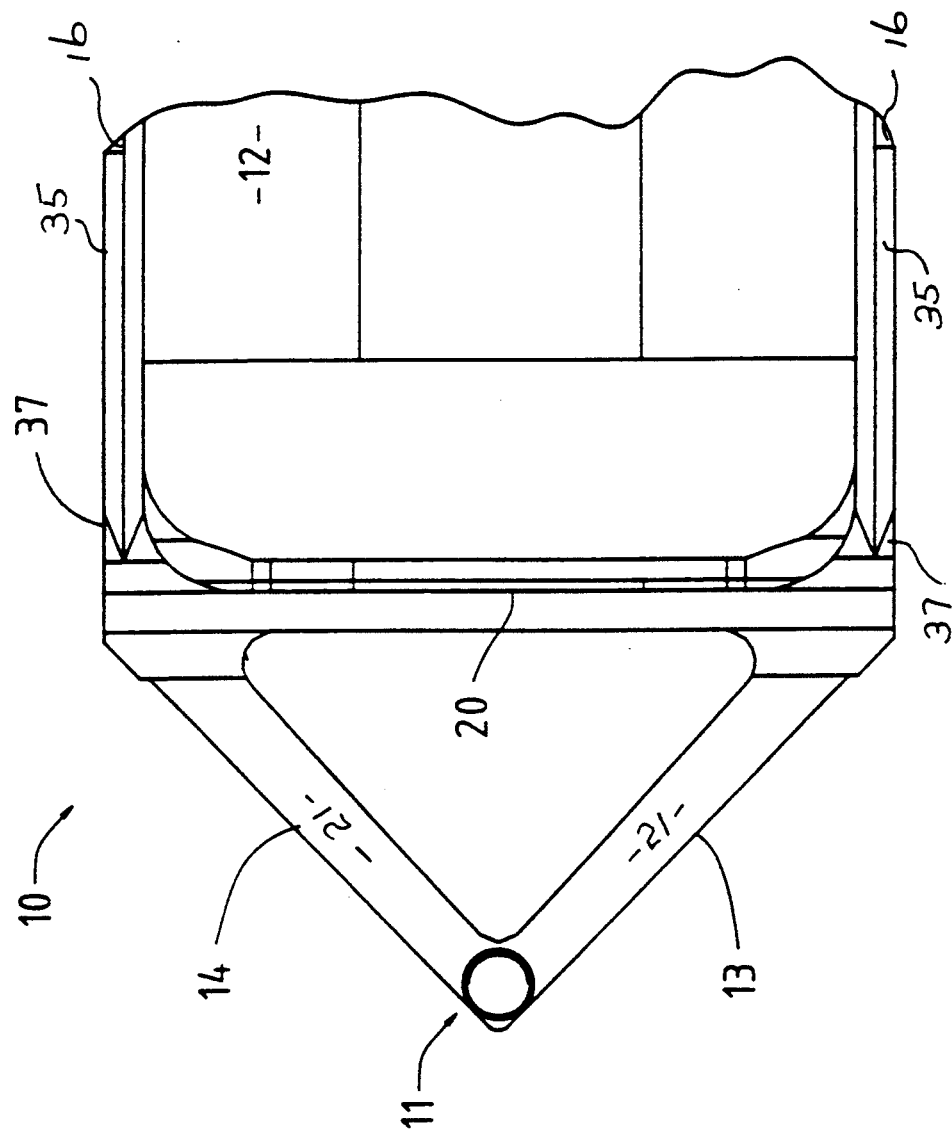
FIG. 3 is top view of the hitch assembly shown in FIGS. 1 and 2.

The hitch assembly 10 shown in FIGS. 1, 2, and 3 includes a hitch pin assembly 11 which is joined to a hopper assembly 12 via a left-hand beam 13 and a right-hand beam 14. The beams 13 and 14 are relatively shallow in section near the hitch pin assembly 11 such that they may clear the rear tires of the prime mover (not shown) to which the hitch assembly 10 is attached. The ends of the beams 13 and 14 remote from the hitch pin assembly 11 are joined to the side walls 16 of the hopper assembly 12 along side joints 17. A cross-beam 20 extends between the side joints 17.

The beams 13 and 14, and the cross-beam 20 are formed as I-beams comprising upper flanges 21 and lower flanges 22 attached to webs 23 through beam assembly welds 24. In the region of the side joints 17, the beam flanges 21 and 22 are cut from flat plate to include inwardly-projecting flange portions 25 which are butt-welded to the upper cross-beam flanges 26 and the lower cross-beam flanges 27. The cross-beam web 30 and the front wall 31 of the hopper assembly 12 are joined to the webs 23 of the beams 13 and 14 through flanged connectors fastened with mechanical fasteners 33 such as bolts or rivets. This technique minimises the loss of fatigue strength occasioned by the application of transverse welds to the webs 23 and flanges 21 and 22. The upper edge of the front plate 31 is attached along the upper cross-beam flange 26 with mechanical fasteners 34.

The flat upper and lower flanges 21 and 22 are joined to the box-section upper and lower cant rails 35 and 36 respectively through transition castings 37 and 40. The latter are formed with rectangular cross-sections at their front ends to match the flanges 21 and 22, and with hollow box cross-sections at their rear ends to match the cant rails 35 and 36.

It will of course be realized that while the above has been given by way of illustrative example of this invention, all such and other modifications and variations thereto as would be apparent to persons skilled in the art are deemed to fall within the broad scope and ambit of this invention as is herein set forth.

We claim:

1. An integral hitch assembly for an articulated trailer having an open-topped box-like hopper as its primary load-carrying member and including left-hand and right-hand side walls and a front wall, said articulated trailer being supported by said integral hitch assembly at its leading end,
   and wherein said integral hitch assembly extends forwardly from and is attached rigidly to the front ends of said left-hand and right-hand side walls of the open-topped hopper for articulated connection to the pivot pin of a draft vehicle, said integral hitch assembly comprising:
   a hitch pin housing;
   a pair of rearwardly diverging front beam members joining said hitch pin housing rigidly to said left-hand and right-hand side walls, and
   a cross-beam member disposed forwardly of and being independent from said front wall and joining the rear ends of said rearwardly diverging front beam members, said cross-beam member co-operating with said rearwardly diverging front beam members to form a rigid structure able to transfer operative bending loads about horizontal axes from one said side wall to the other said side wall substantially independently of said front wall.

2. A hitch assembly as defined in claim 1, wherein said front beam members are each in the form of a fabricated I-beam having a pair of vertically spaced apart flange assemblies joined by a web member and said web member being of relatively small cross-sectional area relative to each said flange assembly.

3. A hitch assembly as defined in claim 2, wherein said I-beam members have substantially vertical webs and substantially horizontal flange members.

4. A hitch assembly as defined in claim 3, wherein said cross-beam member is formed as an I-beam member having a pair of vertically spaced apart horizontally extending flanges joined by a vertical web.

5. A hitch assembly as defined in claim 3, wherein said I-beam members are fabricated from separate web and flange members by welding.

6. A hitch assembly as defined in claim 1, wherein said cross-beam member joins said rearwardly diverging front beam members essentially at the rear end thereof.

7. A method of forming an integral hitch assembly for an articulated trailer having an open-topped hopper as its primary load-carrying member, the hopper including left-hand and right-hand side walls and a front rear wall, the hitch assembly being attached rigidly and integrally to the front portion of the hopper and extending forward for attachment to the pivot pin of a draft vehicle, the method comprising the steps of:
   providing a hitch pin housing;
   providing a pair of front beam members for joining the hitch pin housing to respective front left-hand and right-hand ends of the side walls;
   providing a cross-beam member forwardly of and independent from the front wall and joining the rear ends of respective front beam members to form a rigid structure able to transfer operative bending loads about horizontal axes from one side wall to the other side wall substantially independently of the front wall, and
   assembling and rigidly interconnecting the hitch pin housing, the front beam members, and the cross-beam member to form the integral hitch assembly.

8. A method as defined in claim 7, including forming said front beam members as I-beam members, each having a substantially vertical web and substantially horizontal flanges.

9. A method as defined in claim 8, including forming said web members to have a relatively small cross-sectional area relative to said flange assemblies.

10. A method as defined in claim 9, including forming said cross-beam member as an I-beam member having a substantially vertical web member and substantially horizontal flange members.

11. A method as defined in claim 10, including fabricating said I-beam member from separate web and flange members by welding.

12. A method as defined in claim 7 wherein said cross-beam member joins said rearwardly diverging front beam members essentially at the rear ends thereof.

13. In combination, the integral hitch assembly of claim 1 and an articulated trailer, said trailer having an open-topped box-like hopper as its primary load-carrying member and including left-hand and right-hand side walls and a front wall, said trailer being supported by said integral hitch assembly at its leading end, said integral hitch assembly extending forwardly from and being attached rigidly to the front ends of said left-hand and right-hand side walls of the hopper for articulated connection to the pivot pin of a draft vehicle.

* * * * *